United States Patent
Lu et al.

(10) Patent No.: US 10,338,888 B2
(45) Date of Patent: Jul. 2, 2019

(54) ELECTRONIC COMPONENT FOOTPRINT SETUP SYSTEM IN COLLABORATION WITH A CIRCUIT LAYOUT SYSTEM AND A METHOD THEREOF

(71) Applicant: FootPrintKu Inc., Kaohsiung (TW)

(72) Inventors: Cheng-Ta Lu, Kaohsiung (TW);
Yu-Cheng Hu, Kaohsiung (TW);
Guan-Yu Shih, Kaohsiung (TW);
Kun-You Lin, Kaohsiung (TW);
Mong-Fong Horng, Kaohsiung (TW)

(73) Assignee: Footprintku Inc., Kaohsiung (TW)

( * ) Notice: Subject to any disclaimer, the term of this patent is extended or adjusted under 35 U.S.C. 154(b) by 0 days.

(21) Appl. No.: 15/671,273

(22) Filed: Aug. 8, 2017

(65) Prior Publication Data

US 2019/0050200 A1    Feb. 14, 2019

(51) Int. Cl.
*G06F 17/50* (2006.01)
*G06F 7/32* (2006.01)
*G06F 16/23* (2019.01)

(52) U.S. Cl.
CPC ............ *G06F 7/32* (2013.01); *G06F 16/23* (2019.01); *G06F 17/509* (2013.01); *G06F 17/5072* (2013.01); *G06F 2217/04* (2013.01); *G06F 2217/74* (2013.01)

(58) Field of Classification Search
CPC ............. G06F 17/5045; G06F 17/5068; G06F 17/5081

USPC ................................... 716/137, 139
See application file for complete search history.

(56) References Cited

U.S. PATENT DOCUMENTS

| | | | | |
|---|---|---|---|---|
| 2002/0083400 A1* | 6/2002 | Chung | ............... | G06F 17/5068 716/102 |
| 2007/0038967 A1* | 2/2007 | Brathwaite | ............ | G06F 17/50 716/102 |
| 2013/0090897 A1* | 4/2013 | Uchikura | ............ | G06F 17/5045 703/1 |
| 2015/0302130 A1* | 10/2015 | Hirschman | ......... | G06F 17/5072 716/137 |

* cited by examiner

*Primary Examiner* — Paul Dinh
(74) *Attorney, Agent, or Firm* — Muncy, Geissler, Olds & Lowe, P.C.

(57) ABSTRACT

An electronic component footprint setup system in collaboration with a circuit layout system and a method thereof are provided in the present disclosure. The electronic component footprint setup system in collaboration with a circuit layout system provides a user operating the circuit layout system with an interface on which parameters of an electronic component footprint to be created are configured; the parameters of the electronic component footprint are transformed for conforming to electronic component footprint specifications used in the circuit layout system; characteristic values of the electronic component footprint are calculated according to electronic component footprint specifications and electronic component footprint setup regulations; the electronic component footprint is created in the circuit layout system according to the characteristic values.

6 Claims, 4 Drawing Sheets

ELECTRONIC COMPONENT FOOTPRINT SETUP SYSTEM IN COLLABORATION WITH A CIRCUIT LAYOUT SYSTEM AND A METHOD THEREOF

BACKGROUND OF THE INVENTION

1. Field of the Invention

The present disclosure relates to an electronic component setup technique, particularly an electronic component footprint setup technique in collaboration with a circuit layout system.

2. Description of the Prior Art

For current PCB layouts, a circuit layout design generally draws needed electronic component footprints and creates a footprint database for follow-up circuit layouts.

With various electronic components and PCB techniques continuously emerging, a circuit layout engineer has to create more complex electronic components and routinely update a footprint database. Furthermore, a circuit layout engineer who constantly needs to check component footprints of the specifications might draw erroneous footprints during the drudgery which further poses a risk to the correctness of a circuit layout.

The present disclosure provides a solution for PCB layouts without the above-mentioned problems.

SUMMARY OF THE INVENTION

As a technical solution to settle the above problems, an electronic component footprint setup system in collaboration with a circuit layout system is provided in the present disclosure.

To this end, an electronic component footprint setup system in collaboration with a circuit layout system is presented hereinafter. The electronic component footprint setup system which works with a circuit layout system includes a footprint setup user interface, a data transformation module, a setup regulation module, a characteristic operation module and a component footprint setup module. The footprint setup user interface provides an external user operating the circuit layout system with an interface on which parameters of an electronic component footprint to be created are configured. The data transformation module, which is connected to the footprint setup user interface, transforms parameters of an electronic component footprint to conform with electronic component footprint specifications used in the circuit layout system. The setup regulation module provides a user with setup regulations for configurations of electronic component footprint. The characteristic operation module, which is connected to both the data transformation module and the setup regulation module, is used to calculate characteristic values of the electronic component footprint according to the electronic component footprint specifications and the electronic component footprint setup regulations. The component footprint setup module, which is connected to both the characteristic operation module and the footprint setup user interface, is used to create the electronic component footprint in the circuit layout system according to the characteristic values.

The present disclosure further provides a method of an electronic component footprint setup system in collaboration with a circuit layout system. The method which works with a circuit layout system includes the following steps: an external user operating a circuit layout system configures parameters of an electronic component footprint to be created; the parameters are transformed to conform with electronic component footprint specifications used in the circuit layout system; the electronic component footprint setup regulations are provided to the user for configurations; characteristic values of the electronic component footprint are calculated according to the electronic component footprint specifications and the electronic component footprint setup regulations; the electronic component footprint is created in the circuit layout system according to the characteristic values.

In summary, an electronic component footprint setup system in collaboration with a circuit layout system and a method thereof in the present disclosure are effective in quickly creating a specific electronic component footprint and supersede the conventional manual operation process of a circuit layout engineer in the past.

BRIEF DESCRIPTION OF THE DRAWINGS

The technical content, purposes and effects of an electronic component footprint setup system in collaboration with a circuit layout system in the present disclosure are further explained in preferred embodiments and accompanying drawings which are shown as follows.

DETAILED DESCRIPTION OF THE PREFERRED EMBODIMENTS

An electronic component footprint setup system in collaboration with a circuit layout system and a method thereof are explained in preferred embodiments; however, these embodiments should not be considered as examples to limit the scope of the patent application.

Figure 1:
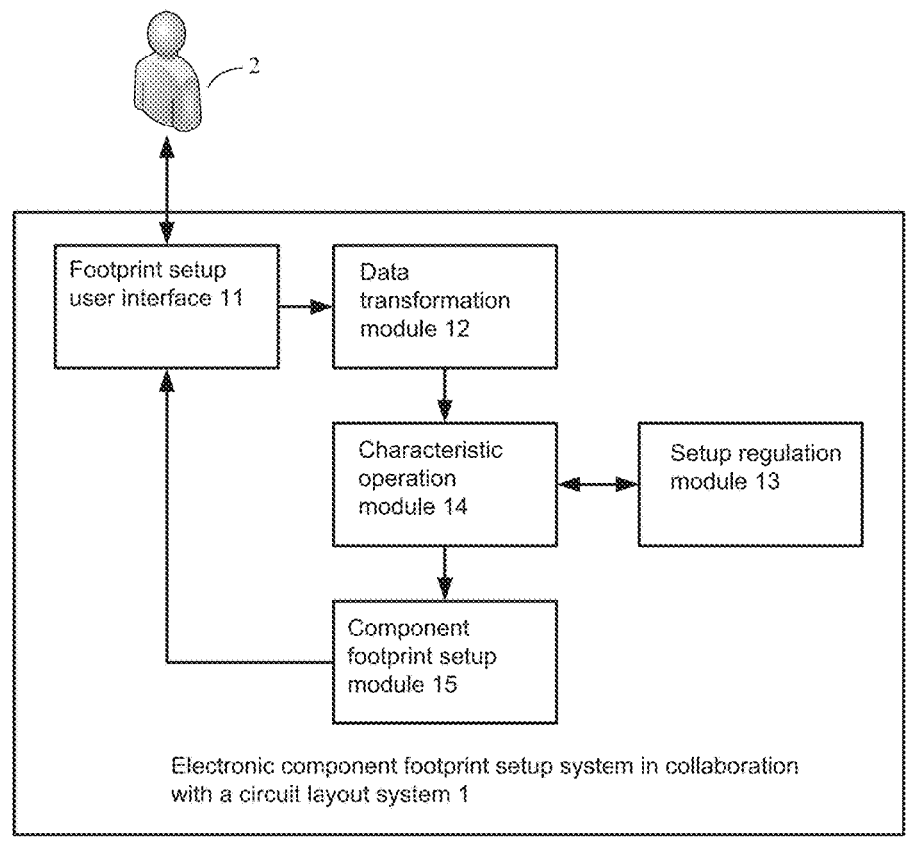
FIG. 1 is a schematic view of an electronic component footprint setup system in collaboration with a circuit layout system according to a first embodiment.

Referring to FIG. 1, which is a schematic view of an electronic component footprint setup system in collaboration with a circuit layout system 1 in the first embodiment of the present disclosure. The electronic component footprint setup system in collaboration with the circuit layout system includes modules as follows: footprint setup user interface 11, data transformation module 12, setup regulation module 13, characteristic operation module 14 and component footprint setup module 15. The footprint setup user interface 11 provides an external user 2 who operates a circuit layout system with an interface on which parameters of an electronic component footprint to be created are configured. The data transformation module 12, which is connected to the footprint setup user interface 11, transforms parameters of an electronic component footprint for conforming to electronic component footprint specifications used in the circuit layout system. The setup regulation module 13 provides the user 2 with electronic component footprint setup regulations for configurations. The characteristic operation module 14, which is connected to both the data transformation module 12, and the setup regulation module 13 are used to calculate characteristic values of an electronic component footprint according to the electronic component footprint specifications and the electronic component footprint setup regulations. The component footprint setup module 15, which is connected to the characteristic operation module 14, is used to create an electronic component footprint in the circuit layout system according to the characteristic values. The electronic component footprint which has been created completely is displayed on the footprint setup user interface 11 systematically.

The footprint setup user interface 11, the data transformation module 12, the setup regulation module 13, the characteristic operation module 14 or the component footprint setup module 15 are optionally provided with a software module or programmable digital circuitry which runs in a computer device. The circuit layout system is a software program for PCB (printed circuit board) circuit layouts, for example PCB design software such as, without limitation, Protel, OrCAD and Allegro.

In another embodiment, the electronic component footprint represents a footprint of an electronic component mounted on a PCB. In a further embodiment, the parameters of an electronic component footprint further includes at least one of component sizes and pad sizes. In yet another embodiment, the characteristic values describe geometric relationships among internal pads of an electronic component footprint. In yet a further embodiment, the electronic component footprint follows at least one of layout rules and file formats for a circuit layout system.

Figure 2:
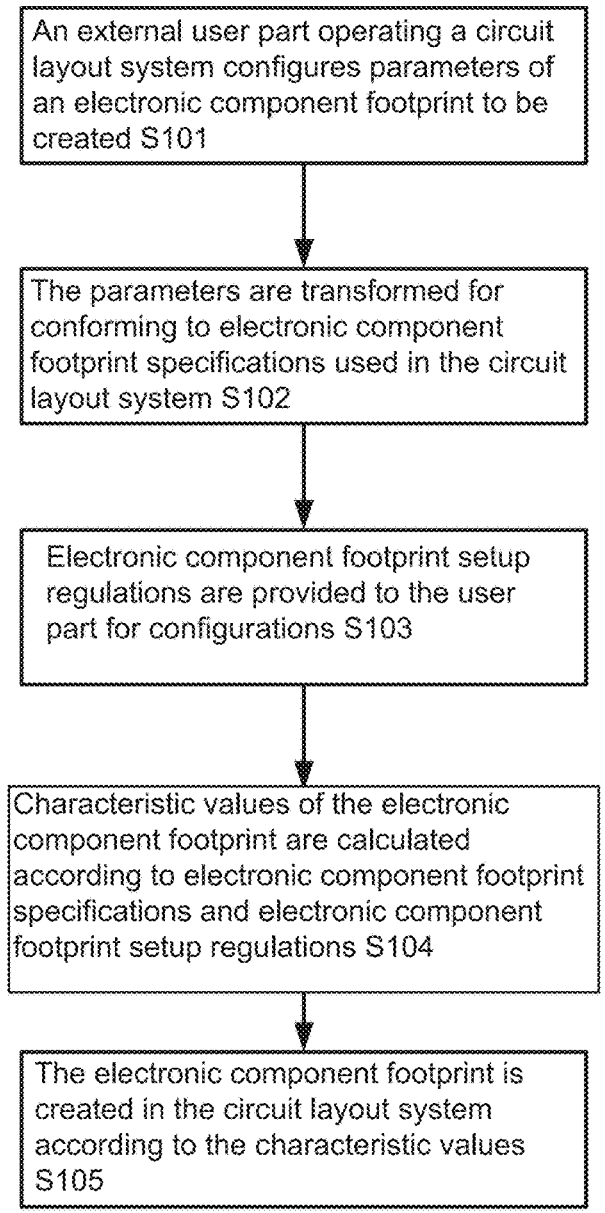
FIG. 2 is a flow chart for a method of an electronic component footprint setup system in collaboration with a circuit layout system according to a second embodiment.

Referring to FIG. 2, which is a flow chart for a method of an electronic component footprint setup system in collaboration with a circuit layout system. The method which works with a circuit layout system includes steps as follows:

S101: an external user operating a circuit layout system configures parameters of an electronic component footprint to be created;

S102: the parameters are transformed for conforming to electronic component footprint specifications used in the circuit layout system;

S103: the electronic component footprint setup regulations are provided to the user for configurations;

S104: characteristic values of the electronic component footprint are calculated according to the electronic component footprint specifications and the electronic component footprint setup regulations;

S105: the electronic component footprint is created in the circuit layout system according to the characteristic values.

In another embodiment, the electronic component footprint in the method is a footprint of an electronic component mounted on a PCB. In a further embodiment, the parameters of an electronic component footprint in the method further includes at least one of component sizes and pad sizes. In yet another embodiment, the characteristic values in the method describe geometric relationships among internal pads of an electronic component footprint. In yet a further embodiment, the electronic component footprint in the method follows at least one of layout rules and file formats for a circuit layout system.

An electronic component footprint setup system in collaboration with a circuit layout system 1 in the present disclosure is explained in the first embodiment; moreover, a method of an electronic component footprint setup system in collaboration with a circuit layout system in the second embodiment features equivalent or similar technical effects.

Figure 3:
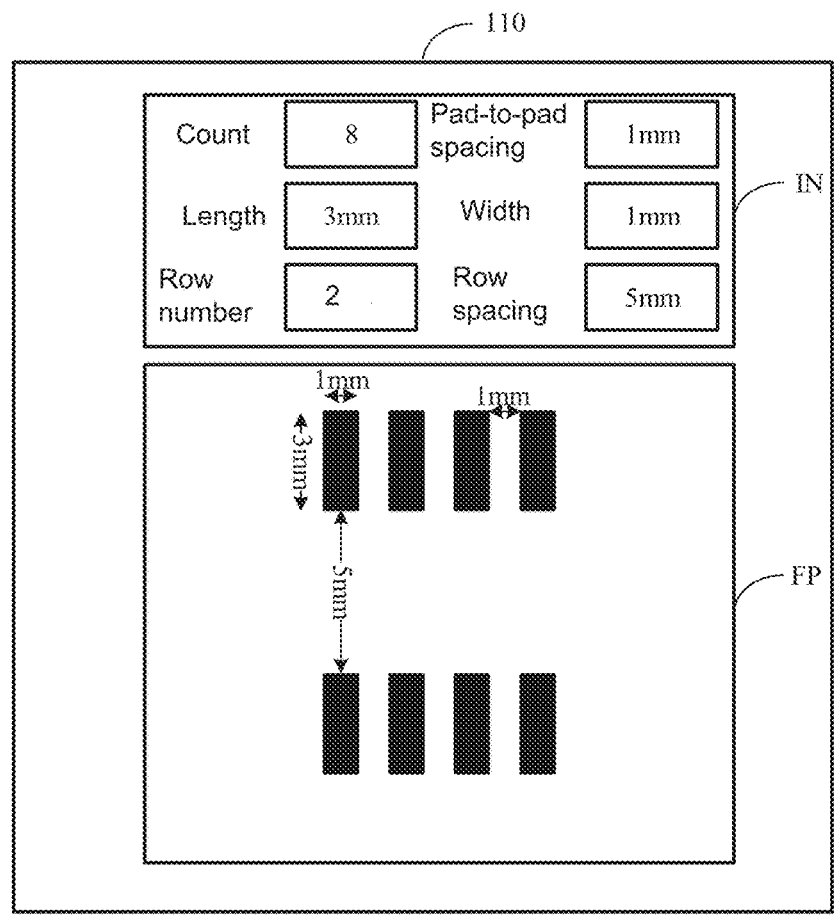
FIG. 3 is a schematic view of operating an electronic component footprint setup system.
Figure 4:
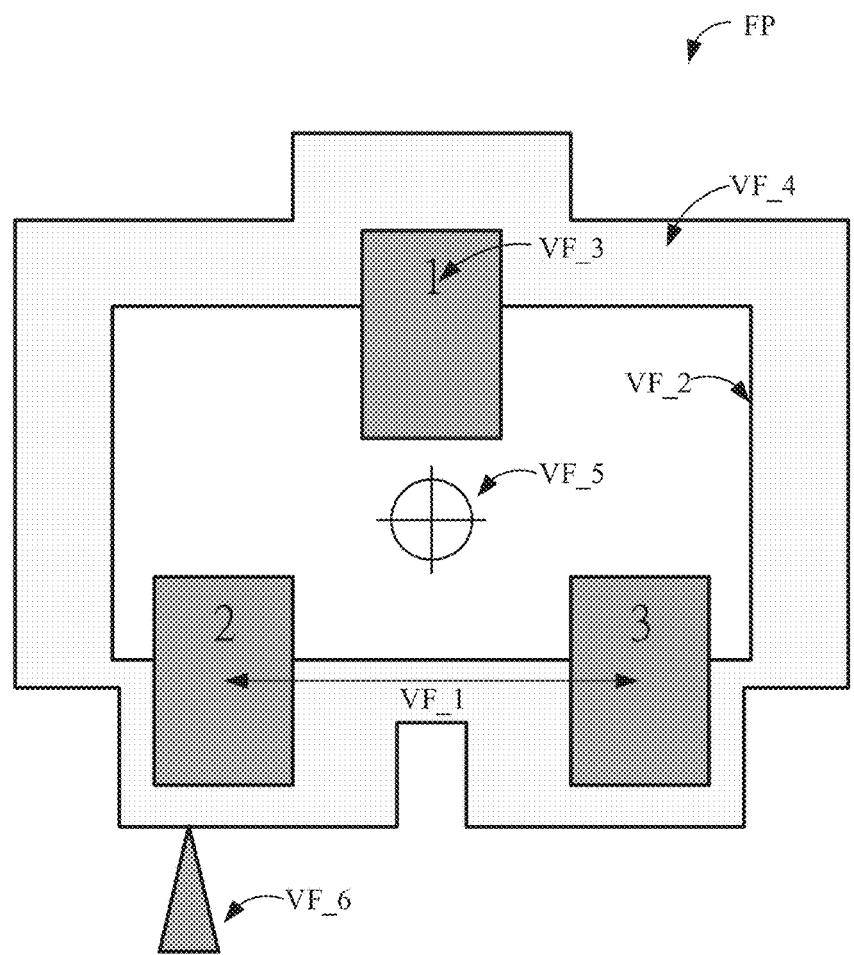
FIG. 4 is a schematic view of a completed electronic component footprint.

Referring to FIG. 3, which is a schematic view of a display image 110 for the footprint setup user interface 11 of an electronic component footprint setup system in collaboration with a circuit layout system 1. The footprint setup user interface 11 includes an input part IN on which some attributes such as component size (exterior dimensions of a component, for example, length and width), pad size (length and width), count, position, row number and spacing are entered and the electronic component footprint setup regulations (for example: tolerances, footprint's dimensional limits) are configured. Moreover, with a specific circuit layout system determined for configurations, the configured parameters are transformed by the electronic component footprint setup system 1 for conforming to file formats and layout rules of the specific circuit layout system and calculating characteristic values of an electronic component footprint, for example, geometric relationships including, without limitation, each pad's coordinate, length and width, pad-to-pad spacing, and PCB layer number n. The electronic component footprint FP, which is created with characteristic values calculated, is shown in FIG. 4.

The above examples are used to explain feasible embodiments in the present disclosure; however, the embodiments are not intended to limit the scope of the patent application. Any equivalent modification or change without departing from the spirit of the present disclosure should be incorporated in the claims thereinafter.

Many changes and modifications in the above described embodiments of the invention can, of course, be carried out without departing from the scope thereof.

What is claimed is:

1. An electronic component footprint setup system in collaboration with a circuit layout system, comprising:
    a footprint setup user interface configured for providing an external user operating the circuit layout system with an interface on which parameters of an electronic component footprint to be created;
    a data transformation module, connected to the footprint setup user interface for transforming the parameters for conforming to electronic component footprint specifications used in the circuit layout system;
    a setup regulation module configured for providing the user with electronic component footprint setup regulations;
    a characteristic operation module connected to the data transformation module and the setup regulation module and used for calculating characteristic values of the electronic component footprint according to the electronic component footprint specifications and the electronic component footprint setup regulations, wherein the characteristic values are provided to describe geometric relationships among internal pads of the electronic component footprint and include each pad's coordinate, length and width, pad-to-pad spacing, and PCB layer number; and
    a component footprint setup module connected to the characteristic operation module and the footprint setup user interface and used for creating the electronic component footprint in the circuit layout system according to the characteristic values.

2. The electronic component footprint setup system as claimed in claim 1, wherein the electronic component footprint is a footprint of the electronic component mounted on a PCB.

3. The electronic component footprint setup system as claimed in claim 1, wherein the electronic component footprint follows at least one of layout rules and file formats for the circuit layout system.

4. A method for setting up an electronic component footprint in collaboration with a circuit layout system, comprising:

configuring parameters of the electronic component footprint to be created by an external user operating the circuit layout system;

transforming the parameters for conforming to electronic component footprint specifications used in the circuit layout system;

providing electronic component footprint setup regulations for the user;

calculating characteristic values of the electronic component footprint according to the electronic component footprint specifications and the electronic component footprint setup regulations, wherein the characteristic values are provided to describe geometric relationships among internal pads of the electronic component footprint and include each pad's coordinate, length and width, pad-to-pad spacing, and PCB layer number; and creating the electronic component footprint in the circuit layout system according to the characteristic values.

5. The method for setting up an electronic component footprint as claimed in claim 4, wherein the electronic component footprint is a footprint of the electronic component mounted on a PCB.

6. The method for setting up an electronic component footprint as claimed in claim 4, wherein the electronic component footprint follows at least one of layout rules and file formats for the circuit layout system.

* * * * *